US008695524B2

(12) United States Patent
Tilley (10) Patent No.: US 8,695,524 B2
(45) Date of Patent: Apr. 15, 2014

(54) BARNACLE FOULING TOOL

(76) Inventor: Glenn Tilley, Missouri City, TX (US)

( * ) Notice: Subject to any disclaimer, the term of this patent is extended or adjusted under 35 U.S.C. 154(b) by 536 days.

(21) Appl. No.: 13/029,051

(22) Filed: Feb. 16, 2011

(65) Prior Publication Data

US 2011/0197919 A1     Aug. 18, 2011

Related U.S. Application Data

(60) Provisional application No. 61/305,260, filed on Feb. 17, 2010.

(51) Int. Cl.
*B63G 8/00* (2006.01)

(52) U.S. Cl.
USPC ....................................................... 114/312

(58) Field of Classification Search
USPC ............. 367/13, 15, 19, 130; 136/6; 114/312, 114/253
See application file for complete search history.

(56) References Cited

U.S. PATENT DOCUMENTS

| | | | | | |
|---|---|---|---|---|---|
| 4,290,123 | A | * | 9/1981 | Pickens | 367/13 |
| 5,203,646 | A | * | 4/1993 | Landsberger et al. | 405/191 |
| 5,351,359 | A | * | 10/1994 | Golden | 15/256.6 |
| 7,145,833 | B1 | * | 12/2006 | Hoogeveen | 367/15 |
| 7,409,919 | B2 | * | 8/2008 | Hoogeveen et al. | 114/312 |
| 7,754,018 | B2 | * | 7/2010 | Lepage et al. | 134/6 |
| 2011/0197919 | A1 | * | 8/2011 | Tilley | 134/9 |

* cited by examiner

*Primary Examiner* — Lars A Olson
*Assistant Examiner* — Jovon Hayes
(74) *Attorney, Agent, or Firm* — Daniel Boudwin; Global Intellectual Property Agency (57) ABSTRACT

Disclosed is a flow-driven antifouling device for a seismic marine streamer cable. A cylindrical housing is circumferentially mounted to a submerged, circular cable. Fluid flow over the cable provides motive power to rotate the device around the outer surface of the cable, preventing barnacles, marine growth and other fouling accumulation. Interior wheels contact the cable outer surface to disrupt fouling growth and control the direction of travel along the length of the cable. Radially-protruding vanes utilize the local fluid flow over the cable to apply a rotation to the device, powering its movement. The orientation of the inner wheels determines corkscrew direction, allowing forward and aft travel along the cable. Continuous and uninterrupted motion prevents fouling development, which improves the fidelity of seismic sensors and decreases drag on the cable.

9 Claims, 7 Drawing Sheets

BARNACLE FOULING TOOL

CROSS REFERENCE TO RELATED APPLICATION

This application claims the benefit of U.S. Provisional Application No. 61/305,260 filed on Feb. 17, 2010, entitled "Barnacle Fouling Tool"

BACKGROUND OF THE INVENTION

1. Field of the Invention

The present invention relates to marine surveying equipment and towed seismic sensors known as streamers. More specifically, this invention relates to devices utilized to continuously traverse submerged streamers for the purposes of preventing adhesion of marine growth that can disrupt signal transfer fidelity of imbedded sensors and increase cable drag.

2. Description of the Prior Art

Marine seismic surveying utilizes a method of reflection seismology to create a model of the seabed surface and the physical properties underlying the seafloor. Typically, seismic sensor lines called streamers are towed behind a maritime vessel near the ocean surface. An external energy source produces an energy wave directed at the seafloor, which reflects towards the surface and is measured using imbedded sensors in the streamer cable. These sensors are typically hydrophone devices that can measure the reflected sound energy. After the data is gathered, a detailed map of the seabed and its constitutive structure can be modeled and analyzed. Typical applications for this type of surveying include creation of detailed maps of the seafloor and for mineral and deposit exploration, namely for locating possible offshore drilling sites for oil and natural gas extraction.

Streamers are typically very long, sometimes kilometers in length. Several streamers are towed behind a maritime vessel simultaneously for data acquisition. The streamers are generally comprised of an insulation fluid or gel with a specific gravity less than one to provide buoyancy. External streamer positioning devices are installed every few hundred meters along each streamer length in order to correct for cable positioning errors.

As the streamers are towed through the ocean water, is it common for marine biological life and nonliving organic material to cling to the streamer outer surface, especially in warmer water regions. The buildup of this material is commonly known as fouling, and comprises different macro and micro organisms, as well as inorganic deposits. The buildup of marine growth, such as barnacles and other organisms, can cause streamer fidelity loss and increased drag on the cable.

Traditional methods of removing fouling along streamer cables include different manual operations that impede continual surveying operations. These methods include retrieval of the cable onboard the vessel in order to remove fouling buildup or sending the streamers away to a facility for professional cleaning and servicing. These methods are both expensive and time consuming. They stop production data acquisition and result in surveying down time, adding significant opportunity cost to the seismic contractor. Labor costs for cleaning the streamers are also higher, along with associated risks with these manual operations. These include the opportunity for crew injury as the streamer is recovered from the water and manually cleaned, as well as the potential for damaging the streamer while being handled and cleaned.

Several devices have been developed to replace these traditional streamer cleaning methods. U.S. Pat. Nos. 7,145,833 and 7,409,919 to Hoogeveen describe streamer cleaning devices that utilize fluid motion along a streamer to propel a cylindrical cleaning device longitudinally and rotationally around the streamer. Exterior vanes act as propellers to drive the motion of the device in a single direction along the streamer, while an internal bristle device removes fouling buildup. While this device is useful for removing fouling, it is limited in its use. The device can only travel in one direction along the streamer, and cannot switch directions. The device travels only once down the length of the streamer before requiring retrieval after each pass, and cannot pass over newer style leveling devices. The mechanical complexity and size of these units is also important to note, as it can affect its usability. These devices are more costly and generate higher acoustic noise than smaller-sized devices for the same purpose. The interior bristles scrap the outer surface of the streamer cables to remove fouling, which generates considerable broad spectrum noise that is difficult to filter and interferes with streamer sensor operation during use.

U.S. Pat. No. 7,754,018, also to Hoogeveen, describes another streamer external cleaning device that utilizes fluid motion to provide motive power to the device as it moves along the length of the streamer. This device provides a direction switching capability, in which the pitch of external turbine blades is adjusted to change the translational direction of motion. This device, along with the two previously reported devices, is significantly complex and produces a large acoustic signal that can disrupt the fidelity of the streamer cable sensors. They also provide a tool that removes fouling after it has adhered to the surface of the streamer, which requires are a rigorous cleaning mechanism that generates considerable noise during operation.

While these devices and methods may be utilized to remove fouling from a streamer cable, an improved antifouling device is required that can eliminate the known drawbacks in the prior art.

SUMMARY OF THE INVENTION

In view of the foregoing disadvantages inherent in the known types of antifouling devices now present in the prior art, the present invention provides a new antifouling device wherein the same can be utilized for providing convenience for the user when preventing fouling adhesion to seismic surveying streamer cables towed through bodies of water.

It is therefore an object of the present invention to provide an antifouling device that can prevent barnacle and fouling development along the outer surface of a seismic surveying streamer cable that provides continuous motion along the length of the streamer, including fore and aft motion. One installation per streamer per deployment can be utilized to prevent fouling buildup.

Another object of the present invention is to provide an antifouling device that provides a switching mechanism to allow the device to change directions of travel when encountering a stop, independent of human interaction or guidance.

Another object of the present invention is to provide an antifouling device that is flow driven and can be easily clamped to a seismic streamer cable and submerged in a body of water.

Yet another object of the present invention is to provide an antifouling device that is mechanically simple to construct and produces a relatively lower amplitude of noise during operation.

Other objects, features and advantages of the present invention will become apparent from the following detailed description taken in conjunction with the accompanying drawings.

DETAILED DESCRIPTION OF THE INVENTION

Figure 1:
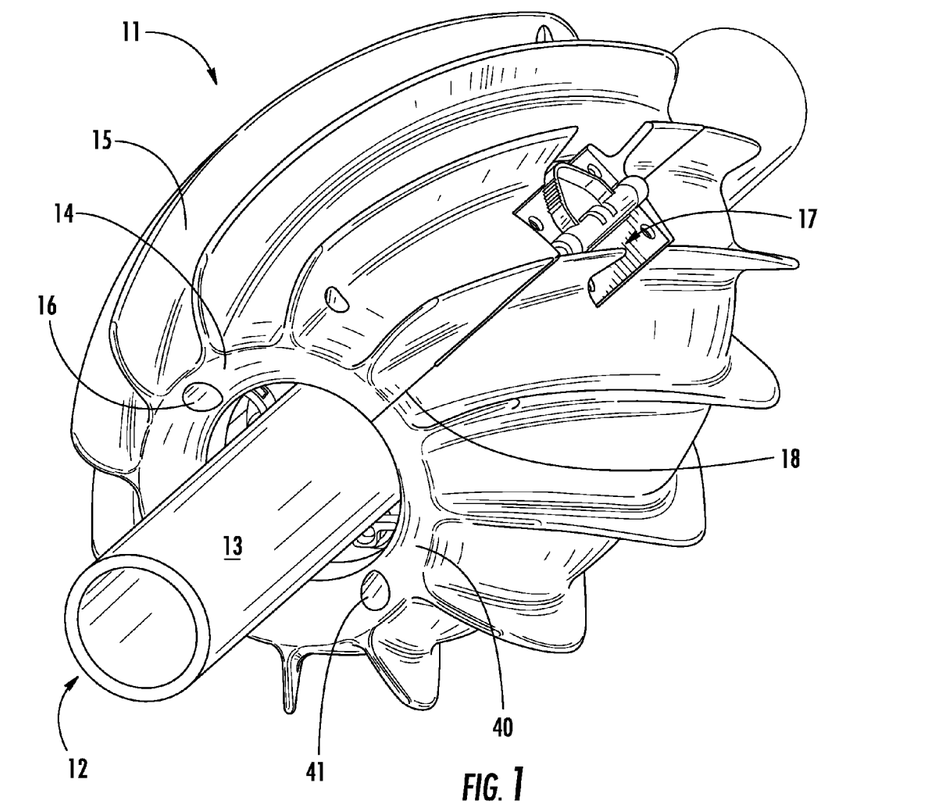
FIG. 1 shows an isometric view of the cylindrical antifouling device clamped to the outer surface of a seismic streamer cable.

Referring now to FIG. 1, there is shown an isometric view of the cylindrical antifouling device 11 clamped around the periphery of a seismic streamer cable 12. The antifouling device 11 is comprised of two opposing shells 14, 40 joined together with a hinge along one edge and a securing clamp 17 along a second edge 18. The clamp 17 is used to join the two shells 14, 40 around the outer surface 13 of the streamer cable, as well as act as a release point for the two shells 14, 40. The device 11 translates along and rotates around the streamer cable 12, contacting the streamer outer surface 13 along a surface area patch defined by the contact area between the inner wheels and the streamer outer surface 13. Longitudinal holes 14, 41 allow penetration of a connecting rod between a first and second stop ring, which act to switch the direction of the interior wheels and change the translation and rotation directions of the device 11. For clarity, the stop rings and connecting rods are not shown in this figure.

Motive power is supplied by local fluid pressure acting on curved vanes 15, which are evenly spaced on the outer surface of the device 11. The vanes 15 act together like a helical propeller, similar to individual air foils or propeller blades in marine propulsion systems. Fluid passes over the device 11 and is separated by the vanes 15, creating localized zones of high and low pressure that provide the motive force for rotation. The flow of water is created by the vessel tugging the streamer cable 12 through a body of water at a given velocity. This motion used as a driver for the motion of the device 11 along the streamer cable 12, eliminating the need for an internal power source for movement.

Figure 2:
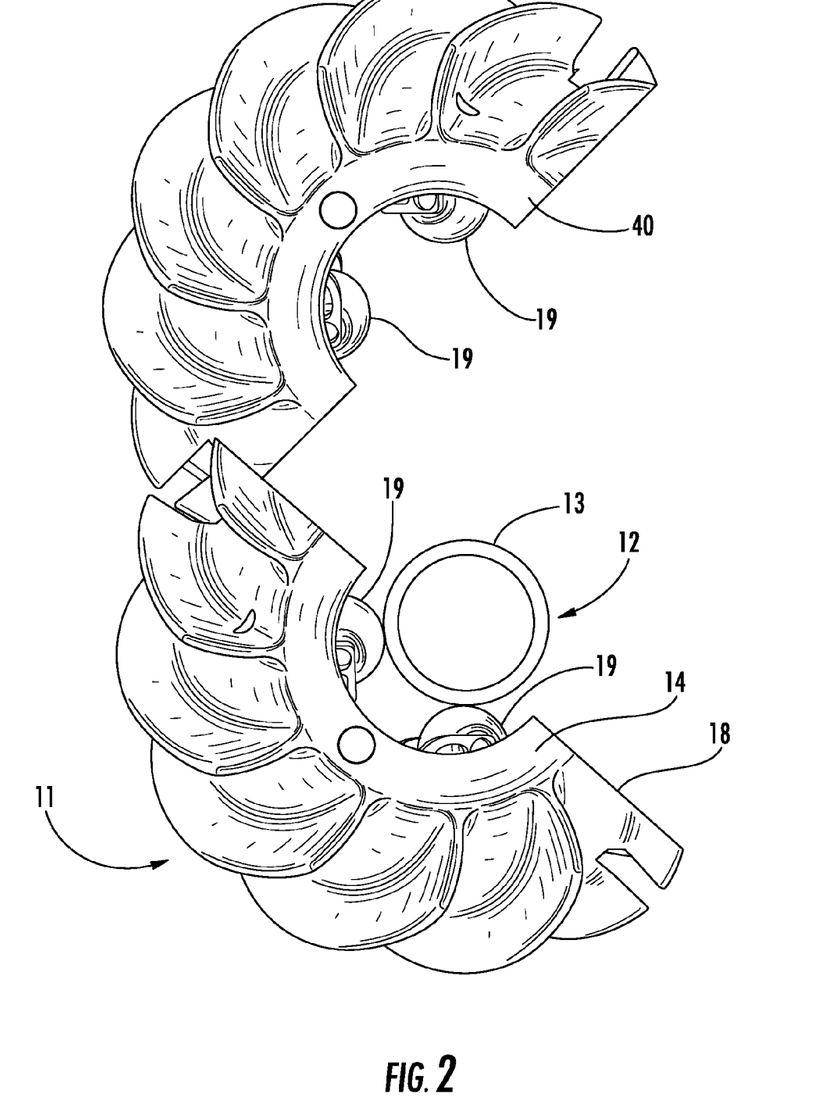
FIG. 2 shows a longitudinal view of the antifouling device in an unclamped position around the outer surface of a seismic streamer cable, capable of being removed or installed on the cable.

Referring now to FIG. 2, there is shown a longitudinal view of an expanded antifouling device 11. The device 11 is shown in an unclamped position, where the two shells 14, 40 are disconnected along the clamping seam 18 and rotated away from one another. This allows the device 11 to be easily removed or applied to a seismic streamer cable 12. Interior wheels 19 contact the outer surface 13 of the cable 12 as the device 11 is clamped on the cable 12. For clarity, stop rings and the end of each shell 14, 40 and their connecting rods are not shown in this figure.

Figure 3:
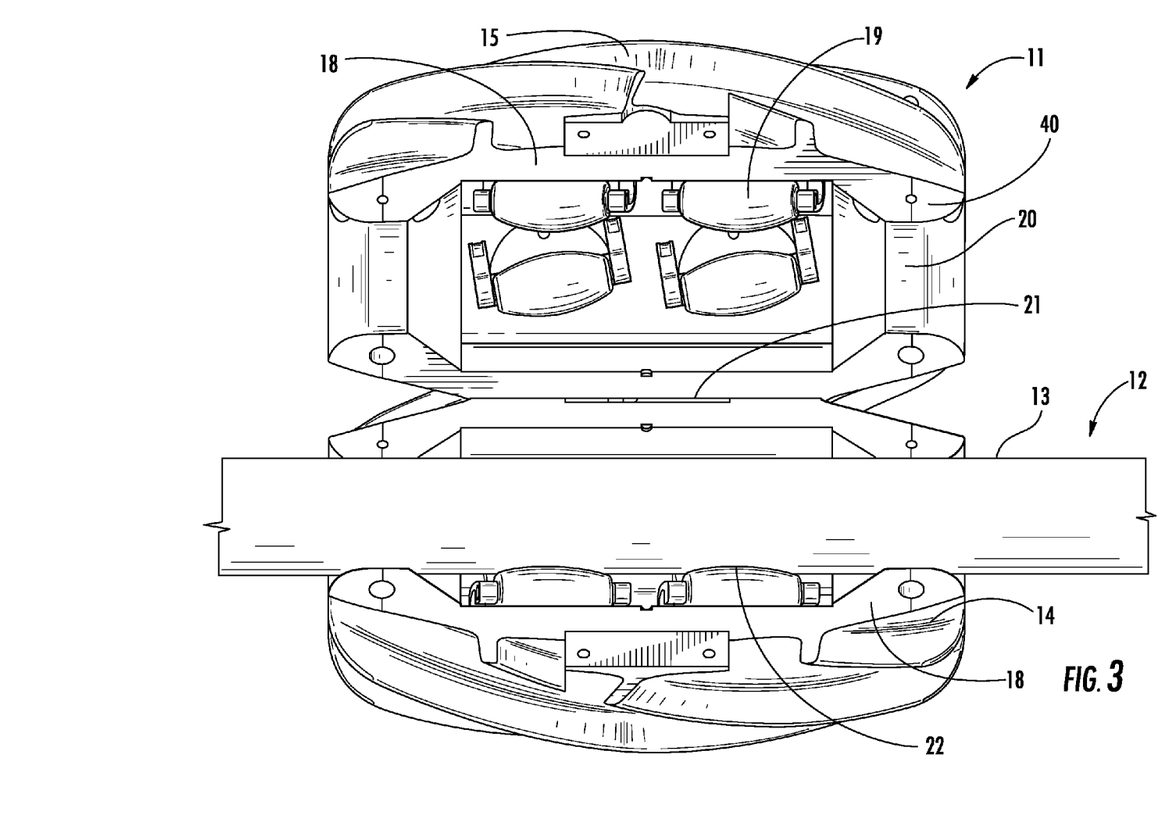
FIG. 3 shows a side view of the antifouling device in an unclamped position around the outer surface of a seismic streamer cable, capable of being removed or installed on the cable.

Referring now to FIG. 3, there is shown a side view of the antifouling device 11 in and unclamped position. The two shells 14, 40 are disconnected and rotated away from each other about a connecting hinge 21. Two sets of interior wheels 19 are interiorly mounted in each of the two shells 14, 40. Both sets of wheels 19 contact 22 the outer surface 13 of the seismic streamer cable 12 as the two shells 14, 40 engage the cable 12. A cylindrical opening 20 at both ends of the shells accepts the cross section of the cable 12 during application of the device 11. The two shells 14, 40 rotate about the hinge 21 and are mated together along an opposite clamping edge 18, where each shell is clamped together. The clamp, stop rings and the connecting rods are not shown in this figure for purposes of clarity.

Figure 4:
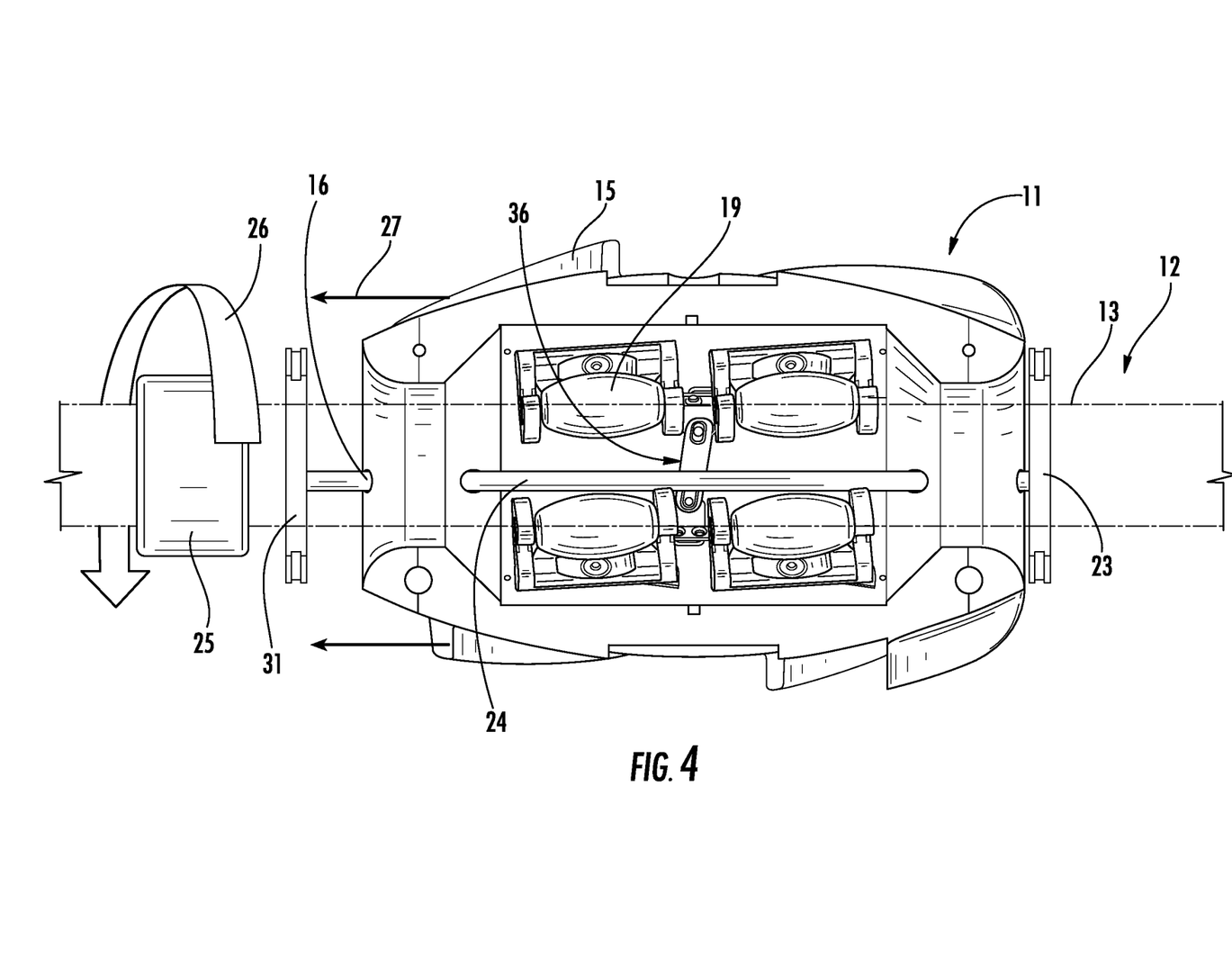
FIG. 4 shows a side view cross-section of the antifouling device clamped on the outer surface of a seismic streamer cable, including arrows denoting the device direction of travel and rotation about the streamer.

Now referring to FIG. 4, there is shown a cross section side view of the antifouling device 11 in its working state and immersed in fluid. The fluid passes between the exteriorly-mounted vanes 15 to generate a corkscrew rotation 26 about the streamer cable 12. Interiorly mounted sets of wheels 19 contact the outer surface 13 of the cable 12, and are vital for determining the translational travel 27 of the device 11. The orientation of the wheels with regard to a normal cross section cut plane of the cable determines the direction of travel 27, independent of the fluid motion or rotation 26. In this way, the device 11 acts like a screw that has a given threaded pitch, and the orientation of the wheels determines the handedness of the pitch and therefore the drive direction 27.

A first and second stop ring 31, 23 mount on either end of the antifouling device 11, and connect via two connecting rods 24. The connecting rods 24 penetrate the device housing through mouse holes 16, allowing load transfer directly from one stop ring 31 to the other 23. The connecting rods 24 are used to change the orientation of the interior wheels 19, and therefore the translational direction 27 of the device 11. When the device 11 approaches a stop 25 along the streamer cable 12, a first stop ring 31 contacts the stop 25 and is depressed towards the device 11. This contact transfers load into the linking mechanism 36 that controls the pitch of the wheels 19, and forces the second stop ring 23 outwards from the device housing 23. In this way, the antifouling device 11 can operate continuously, from one stop to another, changing its translational path 27 without external help from a member of the crew.

Figure 5:
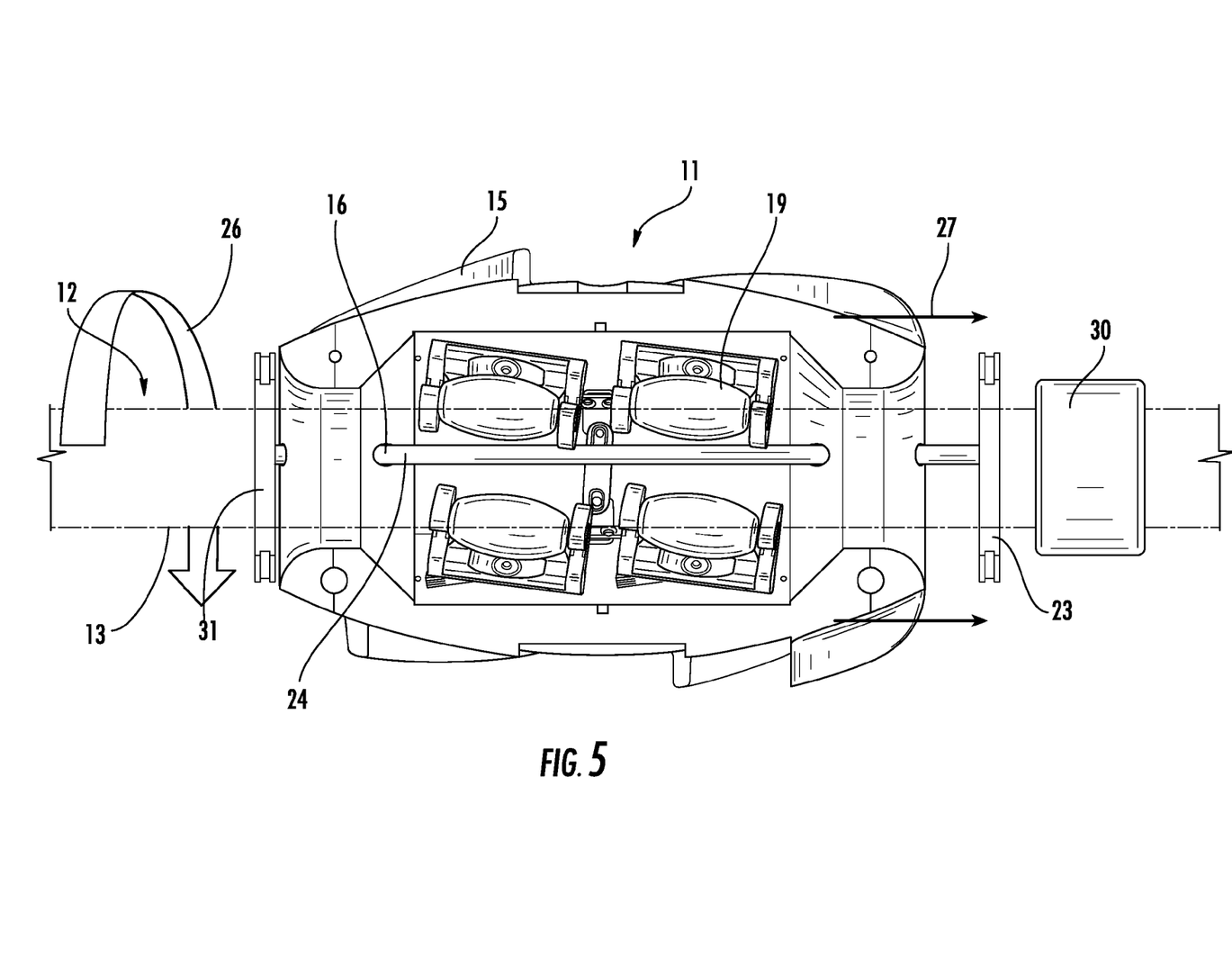
FIG. 5 also shows a side view cross-section of the antifouling device clamped on the outer surface of a seismic streamer cable, the direction of travel along the streamer and the rotation of the tool is opposite of FIG. 4 by a change in orientation of the wheels in contact with the streamer.

Referring to FIG. 5, there is shown a second cross section side view of the antifouling device 11 in its working state and immersed in fluid. The device 11 is oriented in the same manner of FIG. 4, however first stop ring 31 has been depressed against the device housing, reorienting the interior wheels 19 and flipping the translational direction 27 of the device 11 along the streamer cable 12. The rotation angle 26 of the device 11 is unchanged from FIG. 4, as passing fluid over the exterior vanes 15 generates rotation in a single direction 26. A second stop 30 along the streamer cable 12 length, acts as a second barrier for the device 11. A second stop ring 23 contacts the stop 30, and forces the connecting rod 24 to reorient the angle of attack of the interior wheels 19. In this way, the device will continue operation when contacting a hard point or stop 30 along the streamer cable 12 length without human interaction or interdiction.

Figure 6:
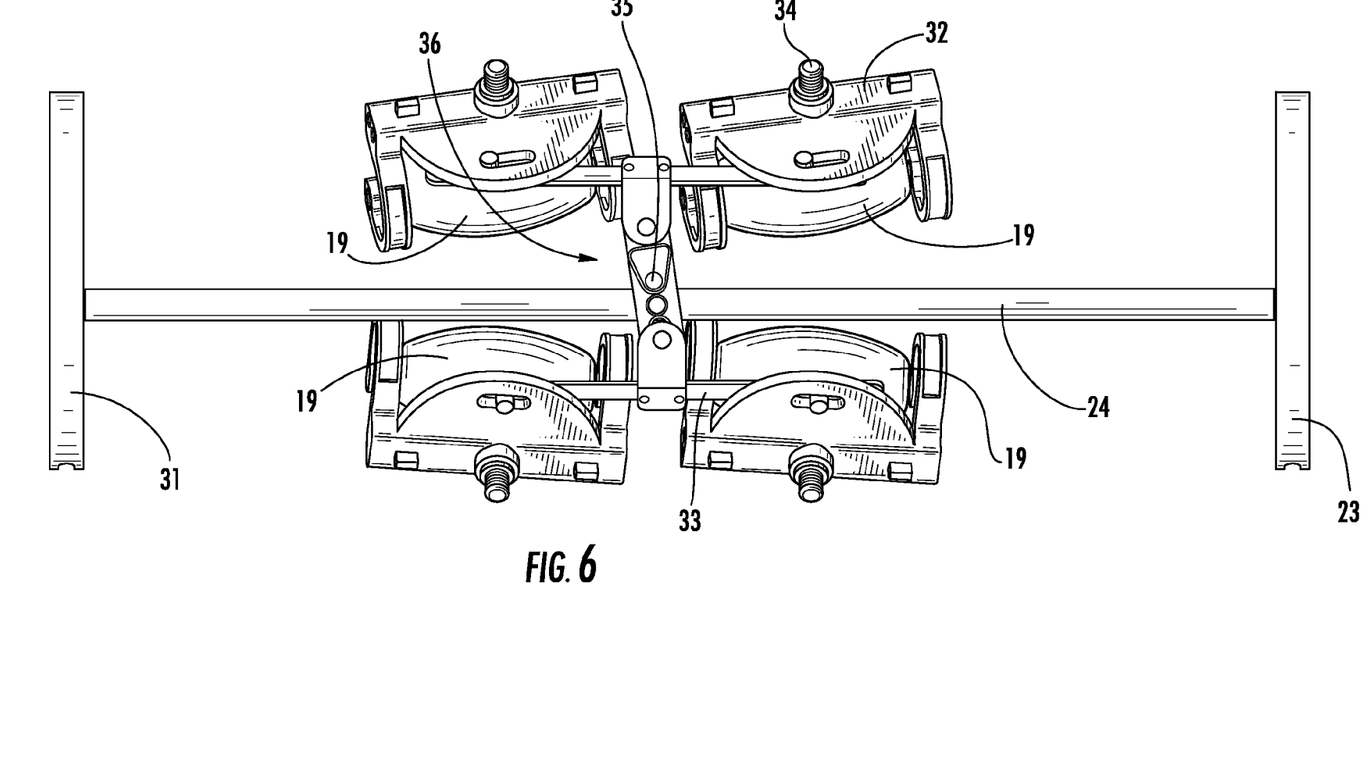
FIG. 6 is an internal view of the antifouling device, including the wheels assemblies and the mechanism for reorienting the wheels and changing their travel path along the streamer outer surface.

FIG. 6 shows one-half of the antifouling device direction switching mechanism, including a first and second stop ring 31, 23, a connecting rod 24 attached to a set of links 36, and a set of wheels 19 attached to the links 36. Control over the antifouling device direction of travel is achieved with this mechanism. Independent of fluid motion about the device, the corkscrew direction around the outer surface of the streamer cable is determined by the angle of attack of the interior wheels 19. By changing their orientation, the handedness of the corkscrew motion is changed, reversing the drive direction achieved with the rotation of the device. In this manner, the device can travel along the streamer cable in either direction, fore or aft, independent of relative fluid motion. The stop rings 31, 23 contact exterior boundaries along the streamer cables, allowing a change in direction and continuous operation of the device.

A pivoting link 36 rotatably attaches to the connecting rod 24, and transfers load into a set of horizontal links 33 that attach to the wheel housings 32. The load forces a change in the orientation of the wheel housings 32 relative to a connection point 34. Through these connections, all eight (8) interior wheels 19 are shifted in orientation, changing their path along the streamer cable and updating the contact path for each wheel 19.

Figure 7:
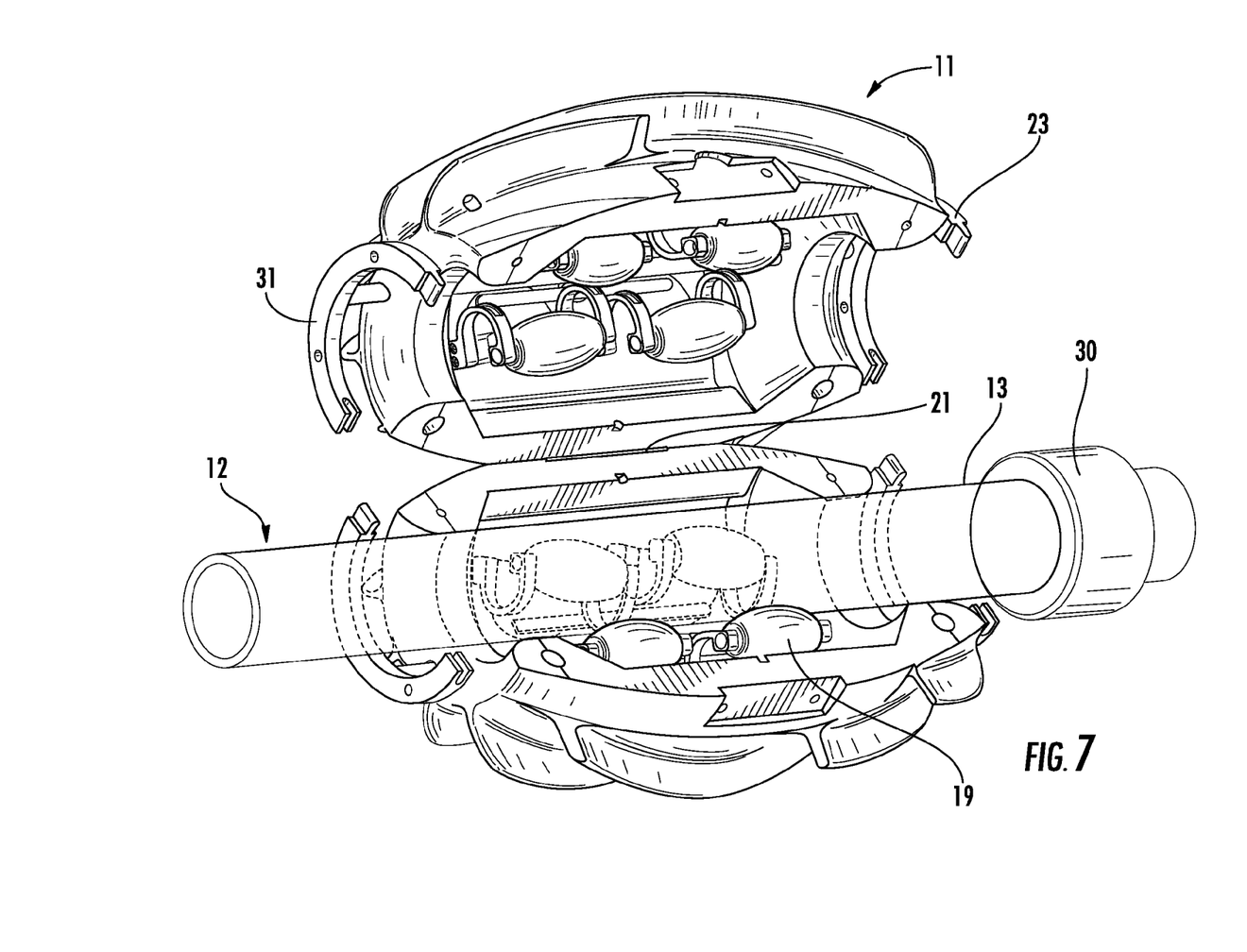
FIG. 7 is an isometric view of the unclamped antifouling device around the outer surface of a streamer cable, allowing removal or installation on the cable.

Referring to FIG. 7, there is shown an isometric view of the unclamped antifouling device 11 around the outer surface 13 of a streamer cable 12. Two opposing shells 14, 40 rotate about a hinge 21 to open and close the device 11 around the exterior of a streamer cable 12. Two sets of interior wheels 19 contact the outer surface of the streamer cable 13 to prevent fouling build-up and attachment of marine growth such as barnacles. A first and second stop ring 31, 23 are circular stop 30 contact agents that are separable into two half-circular segments. This is useful when deploying the device 11 around a cable 12, the stop rings are also separatable about the streamer cable to allow easy installation and removal.

In use a seismic streamer cable antifouling device is used to contact the streamer outer surface to prevent growth buildup that can potentially lower signal quality of the imbedded sensors and increase drag on the towed cable. The goal of the cables is to listen and record sound waves reflecting back from the seafloor, therefore these sensor cables cannot be interfered with during operation. This includes interference caused by fouling development, as well as operational noise from streamer cleaning operations. The length of each streamer cable, and the plurality of such cables towed from a single marine vessel at one time makes cable drag an important variable to consider. Fouling build-up, especially in warmer bodies of water, can significantly increase the weight and cross-sectional area of the cables, increasing drag and strain on the towing vessel.

The disclosed invention proposes a new tool and method for cleaning the exterior of seismic streamer cables imbedded in fluid that solves these problems without impeding surveying operations. The antifouling device provides continuous motion along a single streamer cable length, in both the fore and aft direction and independent of flow direction. Fluid over the device is utilized by the exterior vanes to apply a rigid body rotation about the streamer, which powers the device independently. The translational direction of travel is controlled by the interior wheels, and more specifically the angle of attack of each set of wheels relative to a streamer cable cross sectional plane. The angle of attack determines the handedness of the corkscrew rotation of the device, changing the drive direction of the device similar to changing from a left-hand drive screw to and right-hand drive screw. The same rotational direction causes opposite drive directions, depending on which angle the wheels are oriented.

Continuous motion is an important factor to the disclosed invention, as the device can act independently of human contact. The device is placed on the streamer cable, and can traverse the cable from one stop to another without external guidance. This allows one installation to operate between streamer stops during a surveying deployment, providing continuous defouling of the cable. The device traverses the cable between stops, and acts as a preventative maintenance tool by preventing fouling build up on a clean streamer cable. This ensures no adhesion of barnacles or other marine growth that can impede surveying options, and eliminates the need for barnacle removal and streamer cleaning operations after deployment.

Contact between the wheels and the streamer cable outer surface acts as the mode of preventing fouling adhesion. The contact patch is defined as the area between the wheels and the outer surface of the streamer. Eight (8) wheels simultaneously contact the streamer, and the orientation of the wheels determines the contact path along its outer surface. The angle also determines the number of rotations about the streamer performed per pass between stops. This angle can be adjusted prior to deployment of the device depending on the amount of fouling development anticipated and the number of desired rotations along the streamer length. The entire outer surface of the streamer is contacted several times per deployment to ensure cleanly operation.

Utilization of rolling wheels to remove fouling development is an improvement in the noise generation over typical antifouling tools and devices. Contact between the wheels and the outer surface is a non-slip condition, as opposed to a sliding contact or sweeping operation. Use of such devices as brooms and bristles causes large amounts of acoustic noise, which is counter to the operation of the streamer cables. The noise generated during cleaning interferes with seismological signal measurement devices, like the hydrophones imbedded in the streamers. This reduces their ability to accurately collect data. The noise generated using bristles is also broad spectrum, which is difficult to remove from data using noise filters. Rollers are superior to current techniques in that they do not slide, and do not generate the same amplitude or frequency-independent noise generated by other methods.

Other antifouling tools are installed after barnacles and marine growth buildup have become a problem. The disclosed invention is installed during deployment of a clean, barnacle-free streamer cable. It is intended to be used as a preventative maintenance tool and not a maintenance tool. Barnacle fouling occurs while marine life is microscopic, therefore the energy to remove the growth is less and less noise is generated on the streamer cable hydrophones.

In total, the disclosed invention is an easily deployed device, utilizing a two-piece clamping design. The amplitude of noise during operation is reduced because of this simple wheel contact design with few moving parts, which is important for data accuracy and useful surveying operation. Combined, the antifouling device provides superior marine fouling removal and cleaning results with little to no human interaction or interference during operation.

During operation, if the noise level of the antifouling device becomes too large for the surveying operations, a rotation start/stop control is activated to cease the rotation of the device around the streamer cable. An acoustic pinger system or a depth indicator installed on the device allows external control for shutting down antifouling operation for improved data acquisition capability.

I claim:

1. A seismic streamer cable device that prevents fouling build-up along its exterior surface, comprising:
   a housing adapted for mounting onto a seismic streamer, said housing having at least one external vane, said external vane suited to impart a rotation on said housing about said streamer cable as said streamer is towed through a body of water;

a set of wheels internally and rotatably mounted inside said housing that are arranged to contact said streamer cable exterior surface and are oriented at an angle towards one end of said housing, whereby said housing rotation corresponds to rotational and longitudinal movement of said wheels along a spiral path along the length of said streamer cable exterior surface.

2. The seismic streamer cable device of claim 1, wherein said wheels are rotatably mounted to a switching mechanism that changes said angle of said set of wheels, and thus the direction of said longitudinal movement said wheels and a corresponding translational direction of said seismic streamer cable device.

3. The seismic streamer cable device of claim 2, wherein said switching mechanism is activated by a connecting rod and stop rings mounted on either end of said seismic streamer cable device, said stop rings adapted to force said connecting rod to change said wheel angle direction, and thus said corresponding seismic streamer cable device translational direction.

4. A seismic streamer cable device that prevents fouling build-up along its exterior surface, comprising:

vanes for converting movement of water past a seismic streamer into translational and rotational movement of said device about an exterior surface of said seismic streamer;

a set of wheels internally and rotatably mounted inside said vanes that are arranged to contact said streamer cable exterior surface and are oriented at an angle towards one end of said vanes, whereby said vanes rotation corresponds to rotational and longitudinal movement of said wheels along a spiral path along the length of said streamer cable exterior surface.

5. The seismic streamer cable device of claim 4, wherein said wheels are rotatably mounted to a switching mechanism that changes said angle of said set of wheels, and thus the direction of said longitudinal movement said wheels and a corresponding translational direction of said seismic streamer cable device.

6. The seismic streamer cable device of claim 5, wherein said switching mechanism is activated by a connecting rod and stop rings mounted on either end of said seismic streamer cable device, said stop rings adapted to force said connecting rod to change said wheel angle direction, and thus said corresponding seismic streamer cable device translational direction.

7. A method of preventing fouling build-up along a seismic streamer exterior surface, comprising:

towing a streamer through a body of water;

converting movement of water passing over the streamer into translational and rotational movement of a device positioned about an outer surface of said streamer;

using the translational and rotational movement directly to operate a series of interior wheels within said device cooperatively engaged with the outer surface of the streamer, whereby said wheels traverse a spiral path along said streamer length.

8. The method of claim 7, further comprising using said device interior wheels to control the translation direction of travel between stops along said streamer.

9. The method of claim 7, further comprising the steps of:

switching the direction of said translational movement using a switching mechanism when encountering a stop that alters the angle of said interior wheels, and thus the translational direction of said device along said streamer length.

* * * * *